United States Patent [19]

Lee et al.

[11] Patent Number: 5,241,602

[45] Date of Patent: Aug. 31, 1993

[54] PARALLEL SCRAMBLING SYSTEM

[75] Inventors: Byeong Gi Lee; Seok Chang Kim, both of Seoul, Rep. of Korea

[73] Assignees: Byeong Gi Lee; Seok Chang Kim; Goldstar Information & Communications, Ltd., all of Seoul, Rep. of Korea

[21] Appl. No.: 887,702

[22] Filed: May 22, 1992

[30] Foreign Application Priority Data

Feb. 7, 1992 [KR] Rep. of Korea .................. 1992-1803

[51] Int. Cl.$^5$ .............................................. H04L 9/02
[52] U.S. Cl. ......................................... 380/44; 380/50
[58] Field of Search ............... 380/44, 46, 50; 370/77; 364/717

[56] References Cited

U.S. PATENT DOCUMENTS

| | | | |
|---|---|---|---|
| 3,784,743 | 1/1974 | Schroeder | 380/50 |
| 4,531,022 | 7/1985 | Pioli | 380/50 |
| 4,663,501 | 5/1987 | Popischil | 380/46 |
| 4,669,118 | 5/1987 | Popischil | 380/46 |
| 4,744,104 | 5/1988 | Popischil | 380/50 |
| 4,755,987 | 7/1988 | Lee et al. | 370/77 |
| 4,807,290 | 2/1989 | Popischil | 380/44 |
| 4,837,821 | 6/1989 | Kage | 380/46 |
| 5,031,129 | 7/1991 | Powell et al. | 364/717 |

FOREIGN PATENT DOCUMENTS

CCITT SG
  SVI 12/1991 Australia.
CCITT SG
  XVIII 12/1991 Australia.

OTHER PUBLICATIONS

Report: parallel Scrambling Techniques for Digital Multiplexlers, AT&T Technical Journal, Author Doo-Whan Choi, 123-136; vol. 65, Issues Oct. 18, 1986.

Primary Examiner—Salvatore Cangialosi
Attorney, Agent, or Firm—Darby & Darby

[57] ABSTRACT

A parallel scrambling system comprises an M-bit (M>1) interleaved parallel scrambler for parallel scrambling input signals and an M-bit interleaved multiplexer for multiplexing output signals from the M-bit interleaved parallel scrambler. With this arrangement, an M-bit interleaved parallel scrambling of input signals is carried out prior to a multiplexing thereof. The parallel scrambling system also comprises an M-bit interleaved demultiplexer for receiving a parallel scrambled and multiplexed signal from the M-bit interleaved multiplexer and demultiplexing it and an M-bit interleaved parallel descrambler for descrambling output signals from the demultiplexer to make original signals recover. As the scrambling of input signals is carried out prior to the multiplexing thereof, the scrambler can be operated at the rate identical to the transmission rate of input signals, thereby reducing the manufacture cost and electric power consumption to a minimum.

5 Claims, 6 Drawing Sheets ns using M-bit (M>1) interleaved multiplexer/-
PARALLEL SCRAMBLING SYSTEM

BACKGROUND OF THE INVENTION

1. Field of the Invention

The present invention relates to a parallel scrambling system for parallel scrambling signals generated in systems using M-bit (M>1) interleaved multiplexer/-demultiplexer.

2. Description of the Prior Art

Referring to FIG. 1A, there is illustrated a conventional system using an M-bit (M>1) interleaved multiplexer. As shown in FIG. 1A, the system comprises an M-bit interleaved multiplexer 11 for multiplexing input signals $A_0$ to $A_{N-1}$ and a serial scrambler 12 for serial scrambling a multiplexed transmission signal from the multiplexer 11 to generate a scrambled signal B. On the other hand, another conventional system using an M-bit interleaved demultiplexer (M>1) is illustrated in FIG. 1B. As shown in FIG. 1B, this system comprises a serial descrambler 15 for receiving and descrambling the scrambled signal B and an M-bit interleaved demultiplexer 16 for demultiplexing a descrambled signal from the descrambler 15 to make the original signals $A_0$ to $A_{N-1}$ recover. The serial scrambler 12 includes a serial shift register sequence generator 13 and an exclusive OR gate circuit 17. In similar, the serial descrambler 15 includes a serial shift register sequence generator 14 and an exclusive OR gate circuit 18 both of which have the same constructions as those of the serial scrambler 12, respectively.

In FIGS. 1A and 1B, the reference letter S denotes shift register sequences generated in the serial shift register sequence generators 13 and 14, and B scrambled signals. In the systems shown in FIG. 1A and 1B, serial shift register sequence generators 13 and 14 may be either of a simple shift register generator or a modular shift register generator. FIG. 2A shows a configuration of the simple shift register generator, while FIG. 2B shows a configuration of the modular shift register generator. Also, FIG. 2C shows a practical circuit employing D-type flip-flops and a XOR gate to embody the configuration of FIG. 2A.

Each block shown in FIGS. 2A and 2B denotes a shift register (or a flip-flop). The number 1 or 0 written in each block indicates an initial state value of the corresponding shift register.

A representative example of systems using the above-mentioned M-bit interleaved multiplexer is a synchronous digital hierarchy (SDH) based system proposed by CCITT. This system adopts M=8.

However, such a conventional scrambling system comprises high-rate processing elements for enabling a scrambling of high-rate transmission signals produced by multiplexing signals inputted in a multiplexer, where each input signal corresponds to a synchronous transport module-1 (STM-1) signals with its transmission rate being 155.520 Mbps. Due to such high-rate processing elements, there are disadvantages in terms of manufacture cost and electric power consumption.

Where the input signals are 16 STM-1 signals, this scrambling system should be embodied by using higher-rate processing elements of 2.48 GHz to scramble the transmission signals STM-16 produced after multiplexing. However, such elements can be hardly embodied.

SUMMARY OF THE INVENTION

Therefore, an object of the invention is to eliminate the above-mentioned disadvantages encountered in the prior art and to provide a parallel scrambling system which is capable of parallel scrambling input signals before multiplexing them, then transmitting resultant signals, and at its signal receiving-side, parallel descrambling the resultant signals after demultiplexing them to make original signals recover.

In accordance with the present invention, this object can be accomplished by providing a parallel scrambling system comprising: an M-bit interleaved parallel scrambler for M-bit (M>1) interleaved parallel scrambling n (n>1) input signals and including a first parallel signal generator for generating n (n>1) parallel signals and a first exclusive OR gate circuit having n (n>1) exclusive OR gates for exclusive-ORing said parallel signals from the first parallel signal generator and said input signals, respectively; an M-bit interleaved multiplexer for receiving output signals from said M-bit interleaved parallel scrambler and multiplexing them in the unit of M bits, to output a multiplexed signal; an M-bit interleaved demultiplexer for receiving said multiplexed signal from said M-bit interleaved multiplexer and demultiplexing it in the unit of M bits, to output n (n>1) demultiplexed signals; and an M-bit interleaved parallel descrambler for M-bit interleaved parallel descrambling said demultiplexed signals from said M-bit interleaved demultiplexer to make original signals recover and including a second parallel signal generator having the same construction as that of the first parallel signal generator and generating n (n>1) parallel signals and a second exclusive OR gate circuit having n (n>1) exclusive OR gates for exclusive-ORing said parallel signals from the second parallel signal generator and the demultiplexed signals, respectively.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 3A:
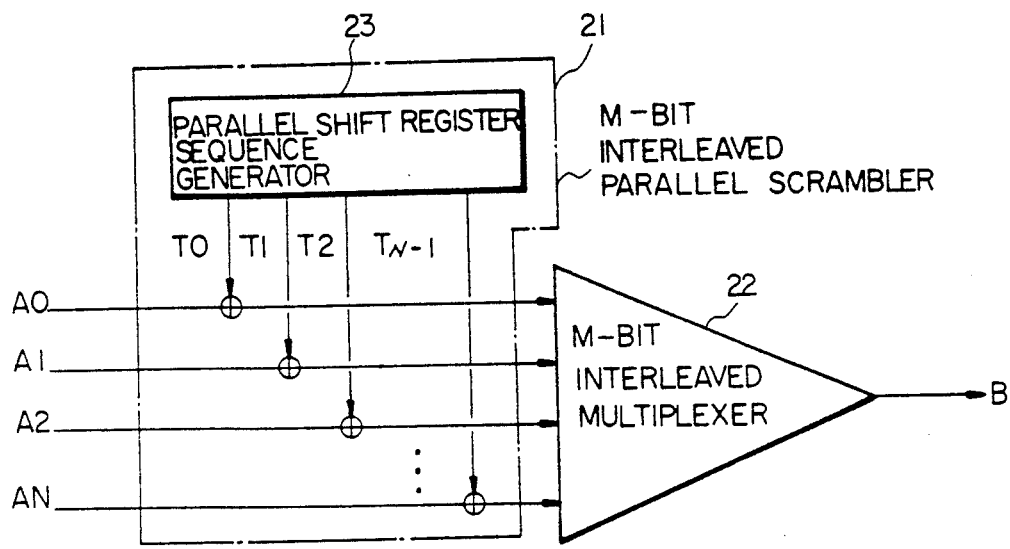
FIGS. 3A and 3B are block diagrams of a parallel scrambling system in accordance with the present invention.
Figure 3B:
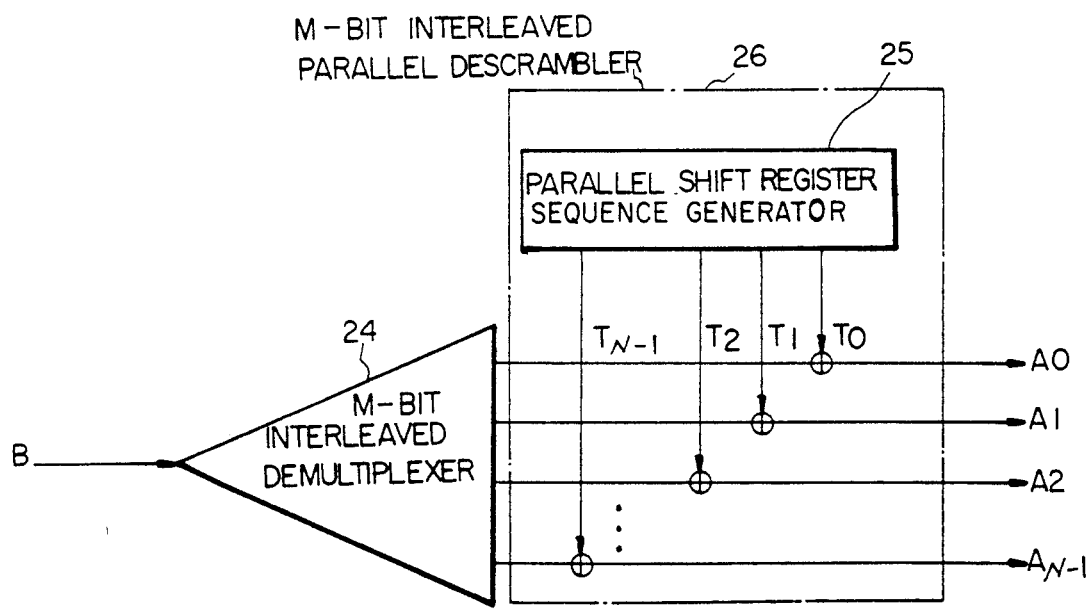

Referring to FIGS. 3A and 3B, there is illustrated a parallel scrambling system in accordance with the present invention.

In accordance with the present invention, the parallel scrambling system comprises an M-bit (M>1) interleaved parallel scrambler 21 for parallel scrambling input signals $A_0$ to $A_{N-1}$ and an M-bit interleaved multiplexer 22 for multiplexing output signals from the M-bit interleaved parallel scrambler 21, as shown in FIG. 3A. That is, the configuration in FIG. 3A is embodied to carry out an M-bit interleaved parallel scrambling of input signals $A_0$ to $A_{N-1}$ prior to a multiplexing thereof. As shown in FIG. 3B, the parallel scrambling system also comprises an M-bit interleaved demultiplexer 24 for receiving a parallel scrambled and multiplexed signal B from the configuration in FIG. 3A and demultiplexing it and an M-bit interleaved parallel descrambler 26 for descrambling output signals from the M-bit interleaved demultiplexer 24 to make original signals $A_0$ to $A_{N-1}$ recover. That is, the configuration in FIG. 3B is embodied to carry out a demultiplexing of the parallel scrambled signal B and then a descrambling of the demultiplexed signal to make original signals $A_0$ to $A_{N-1}$ recover.

Scrambling in one embodiment of the present invention wherein an M-bit interleaved multiplexer is employed is not a scrambling of multiplexed signals (that is, conventional serial scrambling), but an M-bit interleaved parallel scrambling of input signals not multiplexed yet. On the other hand, descrambling in the other embodiment of the present invention wherein an M-bit interleaved demultiplexer is employed corresponds to an M-bit interleaved parallel descrambling of demultiplexed signals. The M-bit interleaved parallel scrambler 21 includes a parallel shift register sequence generator 23 and an exclusive OR gate circuit for exclusive-ORing parallel shift register sequences $T_0$ to $T_{N-1}$ from the parallel shift register sequence generator 23 and corresponding input signals. In similar, the M-bit interleaved parallel descrambler 26 includes a parallel shift register sequence generator 25 and an exclusive OR gate circuit for exclusive-ORing parallel shift register sequences $T_0$ to $T_{N-1}$ from the parallel shift register sequence generator 25 and corresponding input signals, both of which have the same constructions as those of the M-bit interleaved parallel scrambler 21, respectively.

Figure 1A:
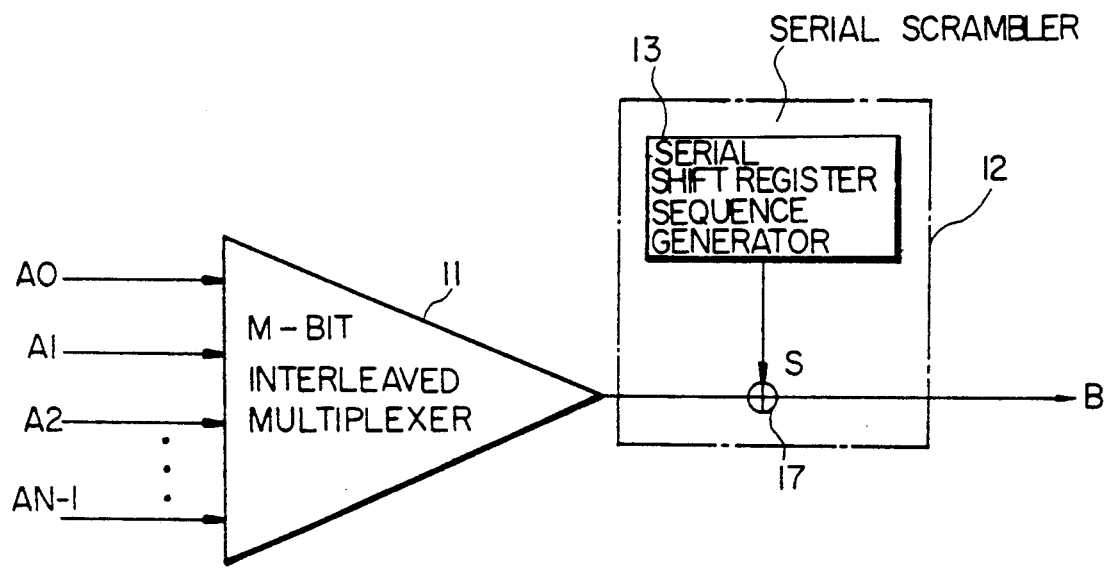
FIGS. 1A and 1B are block diagrams of conventional systems using M-bit interleaved multiplexer/demultiplexer, respectively.

Assuming shift register sequences $T_i$ ($i=0, 1, \ldots,$ and $N-1$) generated by the M-bit interleaved parallel scrambler 21 are parallel shift register sequences and B denotes a scrambled and multiplexed transmission signal, the M-bit interleaved parallel scrambler 21 (MBIPS) applied to the present invention can be embodied based on the following three steps:

First, the relation between a shift register sequence S generated in the serial shift register sequence generator 13 shown in FIG. 1A and parallel shift register sequences $T_i$ generated in the MBIPS is derived. Second, shift register generators (SRGs) generating respective parallel shift register sequences $T_i$ are identified. Finally, SRGs corresponding to parallel shift register sequences $T_i$ are summed, so as to generate all the parallel shift register sequences by a single SRG.

Figure 1B:
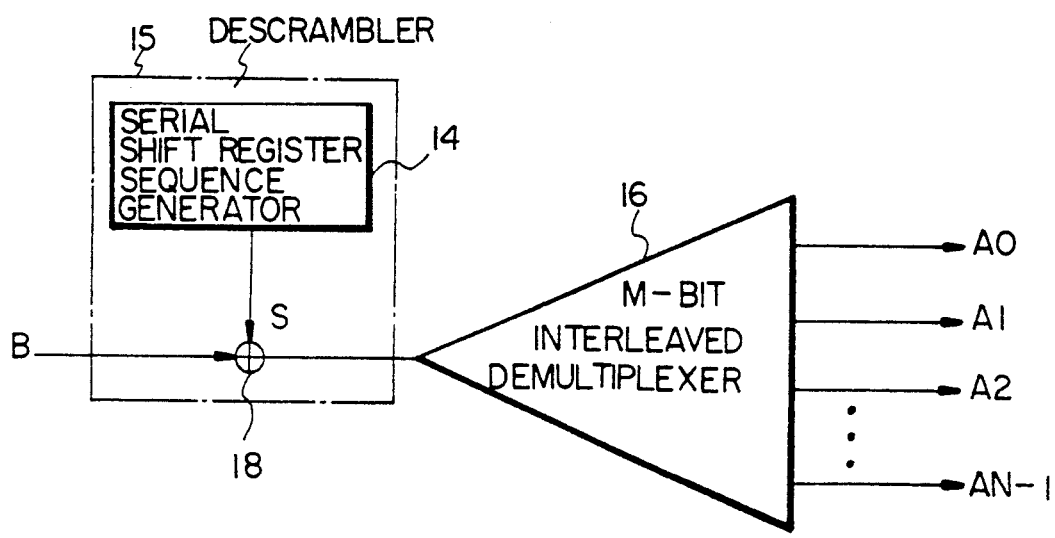

(1) The relation between the shift register sequence S generated in the serial shift register sequence generator and parallel shift register sequences $T_i$ generated in the MBIPS:

For example, assume the shift register sequence S generated in the serial shift register sequence generator 13 in FIG. 1 as follows:

$$S=(S_0, S_1, \ldots, S_{M-1}; S_M, S_{M+1}, \ldots, S_{2M-1}; \ldots ; S_{(N-1)M}, S_{(N-1)M+1}, \ldots, S_{NM-1}; \ldots).$$

Then, parallel shift register sequences $T_i$ required for corresponding the MBIPS to the one for the scrambler of FIG. 1A should be as follows:

$$T_0=(S_0, S_1, \ldots, S_{M-1}; S_{NM}, S_{NM+1}, \ldots, S_{NM+M-1}; \ldots)$$

$$T_1=(S_M, S_{M+1}, \ldots, S_{2M-1}; S_{(N+1)M}, S_{(N+1)M+1}, \ldots, S_{(N+1)M+M-1}; \ldots)$$

$$T_{N-1}=(S_{(N-1)M}, S_{(N-1)M+1}, \ldots, S_{NM-1}; S_{(2N-1)M}, S_{(2N-1)M+1}, \ldots, S_{2NM-1}; \ldots)$$

That is, the M-bit interleaved sequence which is obtained by interleaving the parallel shift register sequence $T_i$ by M-bits should be identical to the shift register sequence S. In other word, the parallel shift register sequences $T_i$ are identical to shift register sequences which are obtained by interleaving MN-decimated shift register sequences by M bits.

(2) SRGs generating respective parallel shift register sequences:

The serial shift register generator 13 shown in FIG. 1A can be constituted by a modular shift register generator (MSRG) comprising n shift registers. In this case, we call $G(x)$ and $D_0(x)$ the generating polynomial and initial state polynomial of MSRG. We also denote the shift register sequence S generated by the scrambler as follows:

$$S=S_{MSRG}[G(x), D_0(x)]$$

Then, MSRG generating parallel shift register sequences $T_i$ can be derived from the following decimation and interleaving proposition;

Proposition 1 (Decimation): Let $U_i$ be the i-th L-decimated sequence of a sequence $$S_{MSRG}\left[ G(x^L), \sum_{j=0}^{nL-1} d_{j,0}x^j \right].$$

Then, $$U_i = S_{MSRG}\left[ G(x), \sum_{j=0}^{n-1} d_{(L-1-i)+jL,0}x^j \right].$$

Proposition 2 (Interleaving): Let T be the interleaved sequence of sequences $S_{MSRG}[G(x), D_0^i(x)]$, $i=0, 1, \ldots,$ and L-1. Then, $$T = S_{MSRG}\left[ G(x^L), \sum_{j=0}^{n-i} x^{L-i-j}D_0^j(x^L) \right].$$

Figure 2A:
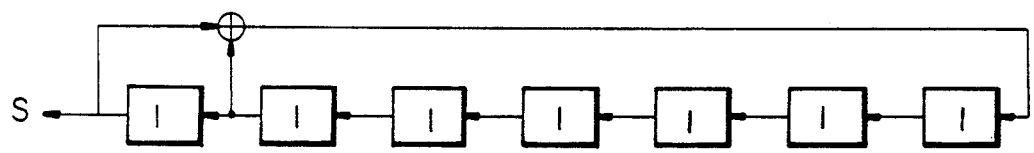
FIGS. 2A to 2C are block diagrams of conventional scramblers.
Figure 2B:
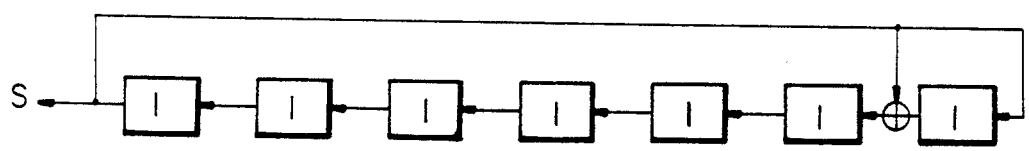
Figure 2C:
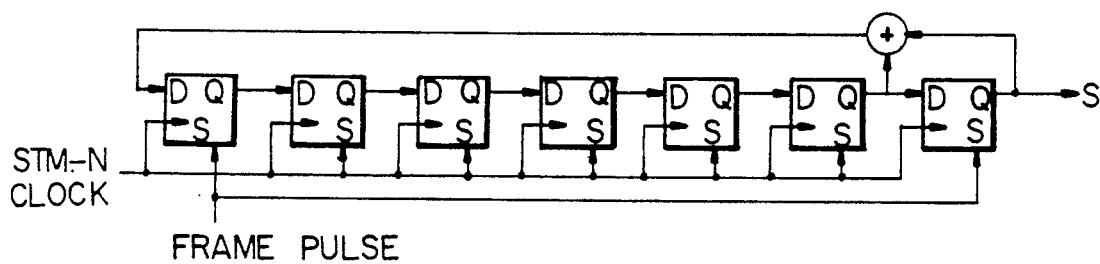

For example, we consider 4:1 byte-interleaved parallel scrambler for the scrambler in FIG. 2A used in the SDH system (that is, $M=8$ and $N=4$). The scrambler in FIG. 2A has a configuration of simple SRG (SSRG) with the characteristic polynomial $C(x)=x^7+x^6+1$ and the initial state polynomial $D_{0c}(x)=x^6+x^5+x^4+x^3+x^2+x^1+1$. A MSRG generating the same sequence as above-mentioned is shown in FIG. 2B. The generating polynomial $G(x)$ and initial state polynomial $D_0(x)$ of the MSRG are $x^7+x+1$ and $x^6+x^5+x^4+x^3+x^2+x$, respectively [specifically, sequences generated by the MSRG can always be also generated by the SSRG whose characteristic polynomial $C(x)$ should be $x^n G(x^{-1})$, where n is the degree of the characteristic polynomial (or the generating polynomial), and whose initial state polynomial $D_{0c}(x)$ should be identical to the quotient of $x^n D_0(x)$ divided by Gx]. Therefore, 32(=MN)-decimated sequences according to Proposition 1 can be expressed as follows:

$$V_0 = S_{MSRG}[G'(x), x^6+x^5+x^3+x^2+x+1],$$

$$V_1 = S_{MSRG}[G'(x), x^6+x^5+x^2+x+1],$$

$$V_2 = S_{MSRG}[G'(x), x^6+x^5+x^2],$$

$$V_3 = S_{MSRG}[G'(x), x^6+x^4+x^2],$$

$$V_4 = S_{MSRG}[G'(x), x^6+x^4+x^3+x^2+x],$$

$$V_5 = S_{MSRG}[G'(x), x^6+x^5+x^4+x^3+x^2+1],$$

$$V_6 = S_{MSRG}[G'(x), x^6+1], \text{ and}$$

$$V_7 = S_{MSRG}[G'(x), x^3],$$

where, $G'(x)$ is $x^7+x+1$.

Using the relation between the parallel sequences and the sequences generated by the scrambler in FIG. 1 and Proposition 2, the parallel sequences can be expressed as follows:

$$T_0 = S_{MSRG}[G'(x^8), x^{55} + x^{54} + x^{53} + x^{52} + x^{51} + \quad (1)$$
$$x^{50} + x^{49} + x^{47} + x^{46} + x^{45} + x^{42} + x^{36} + x^{35} + x^{34} + x^{31} +$$
$$x^{27} + x^{26} + x^{24} + x^{23} + x^{22} + x^{21} + x^{20} + x^{19} + x^{18} + x^{15} +$$
$$x^{14} + x^{11} + x^7 + x^6 + x^2 + x]$$

In a similar manner, $T_1$, $T_2$ and $T_3$ can be derived.

(3) Summed SRG

To sum SRGs generating respective parallel sequences and thus generate all the parallel sequences by a resulting single MSRG or SSRG can be achieved by the following propositions:

Proposition 3 (Embodiment for Summed SSRG): Let $W_i$, $i=0, 1, \ldots, Mn-1$, be the sequence generated by the i-th shift register of the SSRG generating the parallel sequence $T_0$. Let $a_j^i$, $i=0, 1, \ldots, N-1$ and $j=0, 1, \ldots, n-1$, have the value of 0 or 1 satisfying the remainder $$\sum_{j=0}^{n-1} a_j^i x^j \text{ of } x^{iMm}$$

divided by $G'(x)$. m is the smallest integer satisfying the condition $mMN = 1$ modulo (the period of a sequence S) and $G'(x)$ is the generating polynomial of MN-decimated sequences of the sequence S. Then, the parallel sequences $T_i$ can be expressed as follows:

$$T_i = \sum_{j=0}^{n-1} a_j^i W_{jM}, i = 0, 1, \ldots, N-1.$$

Proposition 4 (Embodiment for Summed MSRG): Let $W'_i$, $i=0, 1, \ldots, Mn-1$, be the sequence generated by the i-th shift register of the MSRG generating the parallel sequence $T_0$. Let $b_j^i$, $i=0, 1, \ldots, N-1$ and $J=0, 1, \ldots, n-1$, have the value of 0 or 1 satisfying the quotient $$\sum_{j=0}^{n-1} b_j^i x^j \text{ of } x^n \Sigma a_j^i x^j$$

divided by $G'(x)$. Then, the parallel sequences $T_i$ can be expressed as follows:

$$T_i = \sum_{j=0}^{n-1} a_j^i W_{jM}, i = 0, 1, \ldots, N-1.$$

For example, we consider a 4:1 byte-interleaved parallel scrambler for the scrambler of FIG. 2A. Then, m in Proposition 3 becomes 4, since the period of a sequence generated by the scrambler is 127 (this is because MN=32). Therefore, the parallel sequences can be expressed, according to Proposition 3, as follows:

$$T_0 = W_0,$$

$$T_1 = W_8 + W_{16} + W_{32},$$

$$T_2 = W_8 + W_{32}, \text{ and}$$

$$T_3 = W_8 + W_{24} + W_{48}.$$

By these equations and the equation (1), the SSRG generating the 0th parallel sequence $T_0$ can be found. Then, MBIPS based on the configuration of SSRG shown in FIG. 4A can be derived using Proposition 3. Similarly, MBIPS based on the configuration of MSRG shown in FIG. 4B can be derived using Proposition 4.

Figure 4A:
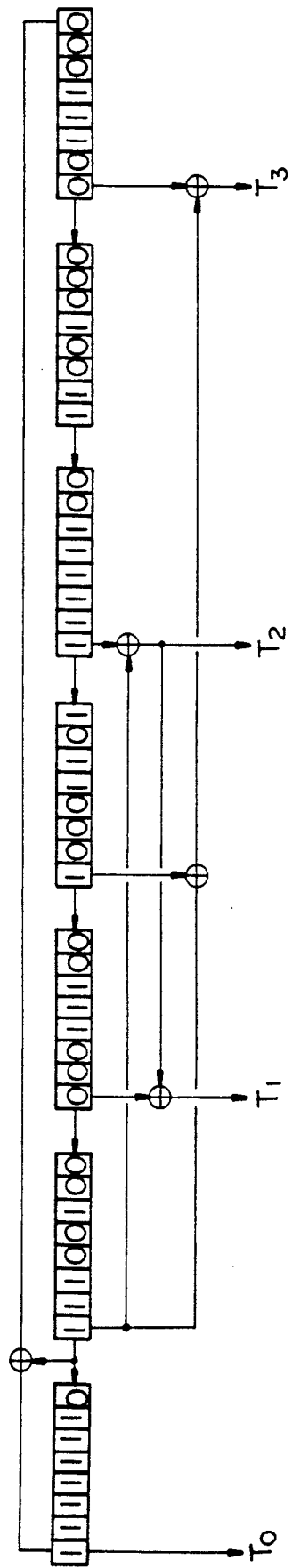
FIGS. 4A to 5B are views illustrating various embodiments of scramblers according to the present invention.
Figure 4B:
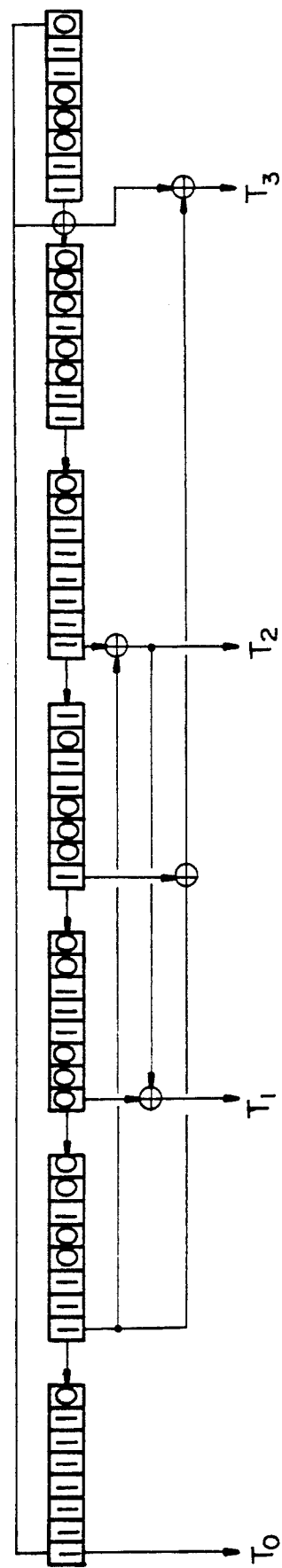

FIG. 4A illustrates one embodiment of an M-bit interleaved parallel scrambler constructed by the above-mentioned method, whereas FIG. 4B illustrates another embodiment of M-bit interleaved parallel scrambler.

In FIG. 4A, the M-bit parallel scrambler (MBIPS) comprises 7 shift register groups each constituted by 8 shift registers sequentially connected with one another. In this case, the reason why the number of shift register groups is 7 is that in this embodiment, the 7th characteristic polynomial ($C(x) = x^7 + x^6 + 1$) is used. These 7 shift register groups are also sequentially connected with one another. However, the final shift register (the leftmost shift register) of the 7th shift register group and the final shift register of the 6th shift register group are exclusive-ORed and is then outputted to the first shift register (the rightmost shift register) of the first shift register group.

In this embodiment, the 7 shift register groups are adapted to generate four parallel scrambling signals $T_0$ to $T_3$. The 0th scrambling signal $T_0$ is generated by the final shift register of the 7th shift register group, while the remaining scrambling signals $T_1$ to $T_3$ are generated using the shift registers and exclusive OR gates.

In FIG. 4B, the M-bit parallel scrambler (MBIPS) comprises 7 shift register groups each constituted by 8 shift registers sequentially connected with one another. These 7 shift register groups are also sequentially connected with one another. However, an output from the final shift register of the 7th shift register group is applied to the first shift register of the first shift register group. At the same time, the output from the final shift register of the 7th shift register group is exclusive-ORed, together with an output from the final shift register of the first shift register group, and the ORed result is then outputted to the first shift register of the second shift register group.

In this embodiment, the 7 shift register groups are also adapted to generate four parallel scrambling signals $T_0$ to $T_3$, in similar to the embodiment of FIG. 4A. The 0th scrambling signal $T_0$ is generated by the final shift register of the 7th shift register group, while the remaining scrambling signals $T_1$ to $T_3$ are generated using the shift registers and exclusive OR gates.

Figure 5A:
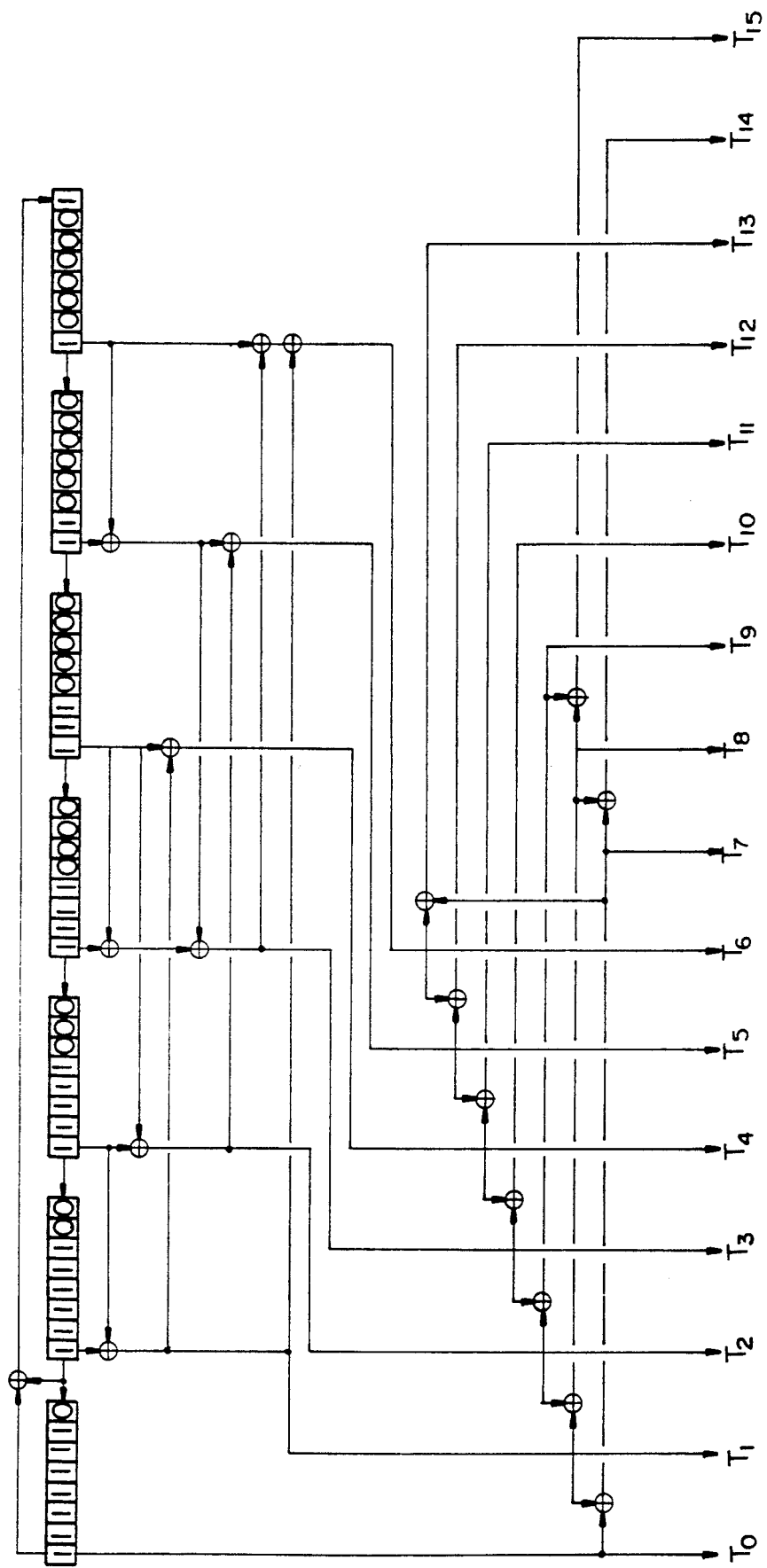
Figure 5B:
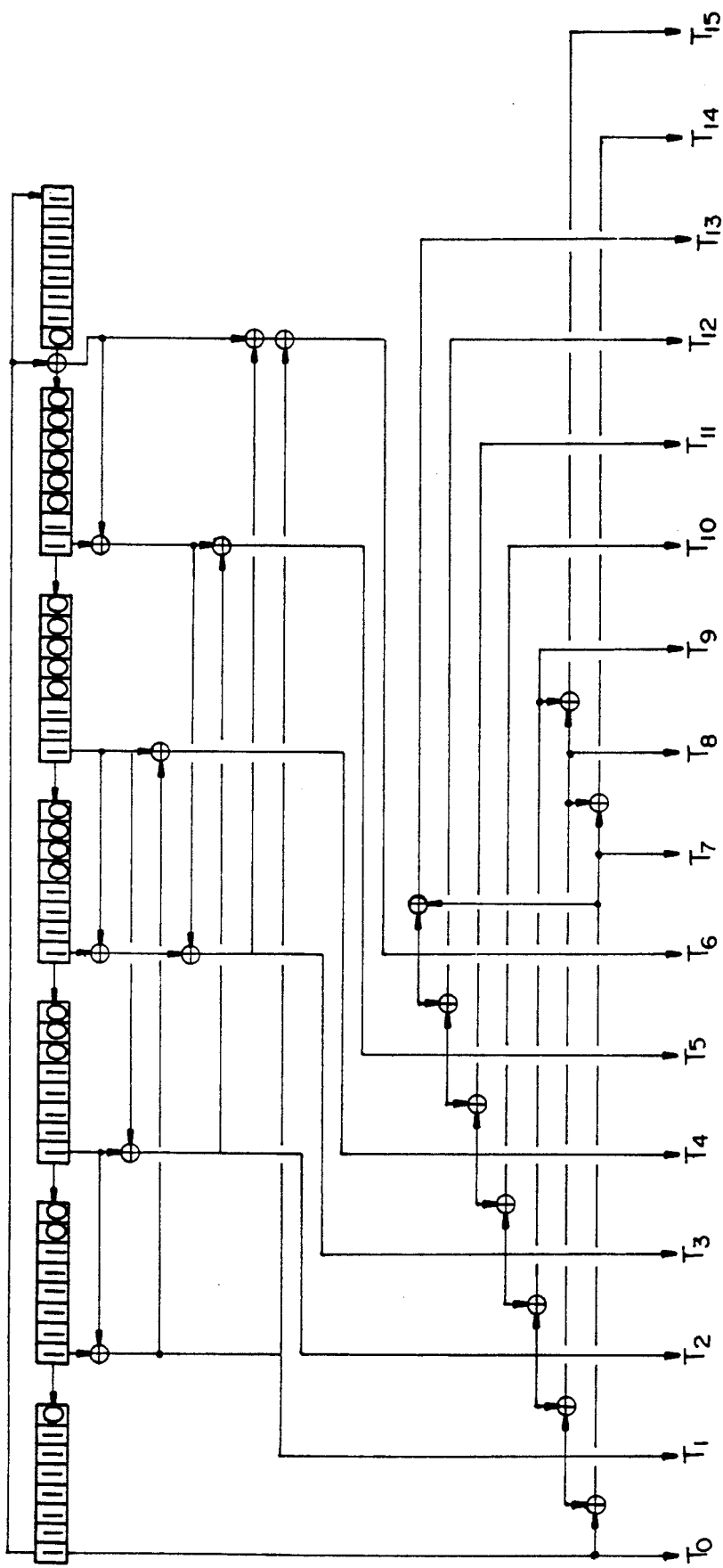

FIG. 5A illustrates an embodiment of a MBIPS based on the configuration of SSRG wherein 16 parallel scrambling signals are generated. The MBIPS is constructed in the same manner as in FIG. 4A. On the other hand, FIG. 5B illustrates another embodiment of an MBIPS based on the configuration of MSRG wherein 16 parallel scrambling signals are generated. The MBIPS is constructed in the same manner as in FIG. 4B.

In FIGS. 4A to 5B, the numeral 1 or 0 inside each shift register indicates the initial state of the shift register.

As apparent from the above description, the present invention provides a parallel scrambling system which is capable of carrying out a scrambling prior to a multiplexing, so that its scrambler can be operated at the rate identical to the transmission rate of input signals, thereby reducing the manufacture cost and electric power consumption to a minimum.

Although the preferred embodiments of the invention have been disclosed for illustrative purpose, those skilled in the art will appreciated that various modifications, additions and substitutions are possible, without departing from the scope and spirit of the invention as disclosed in the accompanying claims.

What is claimed is:

1. A parallel scrambling system comprising:
   an M-bit interleaved parallel scrambler for M-bit ($M>1$) interleaved parallel scrambling n ($n>1$) input signals and including a first parallel signal generator for generating n ($n>1$) parallel signals and a first exclusive OR gate circuit having n ($n>1$) exclusive OR gates for exclusive-ORing said parallel signals from the first parallel signal generator and said input signals, respectively;
   an M-bit interleaved multiplexer for receiving output signals from said M-bit interleaved parallel scrambler and multiplexing them in the unit of M bits, to output a multiplexed signal;
   an M-bit interleaved demultiplexer for receiving said multiplexed signal from said M-bit interleaved multiplexer and demultiplexing it in the unit of M bits, to output n ($n>1$) demultiplexed signals; and
   an M-bit interleaved parallel descrambler for M-bit interleaved parallel descrambling said demultiplexed signals from said M-bit interleaved demultiplexer to make original signals recover and including a second parallel signal generator having the same construction as that of the first parallel signal generator and generating n ($n>1$) parallel signals and a second exclusive OR gate circuit having n ($n>1$) exclusive OR gates for exclusive-ORing said parallel signals from the second parallel signal generator and the demultiplexed signals, respectively.

2. A parallel scrambling system in accordance with claim 1, wherein in case that said M-bit interleaved parallel scrambler has a characteristic polynomial with the degree of n ($n>1$), said first parallel signal generator comprises first to n-th shift register groups each including M ($M>1$) shift registers sequentially connected with one another and means for continuously exclusive-ORing outputs from respective final shift registers of shift register groups corresponding respectively to exponents (k) ($1 \leq K \leq n$) of items ($x^R$) in said characteristic polynomial, among said n shift register groups, then outputting the ORed results to the first shift register of the first shift register group, said means sequentially connecting all the shift register groups with one another.

3. A parallel scrambling system in accordance with claim 2, wherein said first parallel signal generator further comprises means for causing the first parallel signal among said n parallel signals to be generated by the final shift register of the n-th shift register group and causing the remaining parallel signals to be generated by exclusive-ORing outputs from predetermined shift registers.

4. A parallel scrambling system in accordance with claim 1, wherein in case that said M-bit interleaved parallel scrambler has a characteristic polynomial with the degree of n ($n>1$), said first parallel signal generator comprises first to n-th shift register groups each including M ($M>1$) shift registers sequentially connected with one another and means for outputting an output from the first shift register in the n-th shift register group to the first shift register in the first shift register group, and at the same time, exclusive-ORing said output from the first shift register in the n-th shift register group and respective outputs from final shift registers of shift register groups corresponding respectively to exponents (k) ($1 \leq K \leq n$) other than n of items ($x^k$) in said characteristic polynomial, among said n shift register groups, then outputting the ORed results to first shift registers of next higher degree shift register groups, respectively, said means sequentially connecting all the shift register groups with one another.

5. A parallel scrambling system in accordance with claim 4, wherein said first parallel signal generator further comprises means for causing the first parallel signal among said n parallel signals to be generated by the final shift register of the n-th shift register group and causing the remaining parallel signals to be generated by exclusive-ORing outputs from predetermined shift registers.

* * * * *